US006665459B2

(12) United States Patent
Cush et al.

(10) Patent No.: US 6,665,459 B2
(45) Date of Patent: Dec. 16, 2003

(54) WAVELENGTH SELECTIVE OPTICAL FILTER

(75) Inventors: Rosemary Cush, Northampton (GB); William J Stewart, Blakesley (GB); Ruth Hibberson, Northampton (GB)

(73) Assignee: Marconi UK Intellectual Property Limited, Coventry (GB)

( * ) Notice: Subject to any disclaimer, the term of this patent is extended or adjusted under 35 U.S.C. 154(b) by 0 days.

(21) Appl. No.: 10/150,695

(22) Filed: May 17, 2002

(65) Prior Publication Data

US 2002/0131670 A1 Sep. 19, 2002

Related U.S. Application Data

(63) Continuation of application No. 09/734,495, filed on Dec. 11, 2000, now Pat. No. 6,449,403.

(30) Foreign Application Priority Data

Feb. 22, 2000 (GB) ............................. 0003973

(51) Int. Cl.⁷ .............................. G02B 6/26; G02B 6/42
(52) U.S. Cl. .......................................... 385/15; 385/16
(58) Field of Search ............................. 385/15, 16, 18, 385/20, 21, 22, 24, 27, 31, 39, 42, 140

(56) References Cited

U.S. PATENT DOCUMENTS

| | | | | |
|---|---|---|---|---|
| 4,592,043 A | * | 5/1986 | Williams | 359/126 |
| 5,023,944 A | * | 6/1991 | Bradley | 455/611 |
| 5,706,375 A | | 1/1998 | Mihailov et al. | 385/24 |
| 5,739,945 A | | 4/1998 | Tayebati | 359/291 |
| 5,793,513 A | * | 8/1998 | Fishman | 359/179 |
| 5,903,589 A | | 5/1999 | Jewell | 372/46 |
| 6,020,986 A | | 2/2000 | Ball | 359/130 |
| 6,222,964 B1 | * | 4/2001 | Sadot et al. | 385/40 |
| 6,373,632 B1 | * | 4/2002 | Flanders | 359/578 |
| 6,400,738 B1 | * | 6/2002 | Tucker et al. | 372/20 |
| 6,400,856 B1 | * | 6/2002 | Chin | 385/11 |
| 6,411,756 B2 | * | 6/2002 | Sadot et al. | 385/40 |

OTHER PUBLICATIONS

*Three–Mirror Fibre Fabry–Perot Filters of Optimal Design*, Electronics Letters, IEE Stevenage, GB, vol. 26, No. 14, J. Stone, et al., Jul. 5, 1990, pp. 1073–1074.
*Two–Stage Fabry–Perot Filters as Demultiplexers in Optical FDMA Lan's*, Journal of Lightwave Technology, IEEE, New York, A. A. M. Saleh, et all, vol. 7, No. 2, Feb. 1, 1989, pp. 323–330.
*Vertical Coupled–Cavity Microinterferometer on GAAS With Deformable–Membrane Top Mirror*, IEEE Photonics Technology Letters, IEEE, Inc., New York, M. C. Larson, et all, vol. 7, No. 4, Apr. 1, 1995, pp. 382–384.
*Channel–Switching Active Add/Drop Multiplexer with Tunable Gratings*, Electronics Letters, IEE Stevenage, GB, Se Yoon Kim, et al., vol. 34, No. 1, Jan. 8, 1998, pp. 104–105.

* cited by examiner

*Primary Examiner*—Brian Healy
*Assistant Examiner*—Kevin S Wood
(74) *Attorney, Agent, or Firm*—Kirschstein, et al.

(57) ABSTRACT

The present invention provides a wavelength selective optical filter device (240) for receiving input radiation and outputting corresponding filtered output radiation, characterized in that the filter device (240) includes a plurality of at least partially mutually coupled Fabry-Perot optical resonators (330, 340, 360; 360, 400, 430) for filtering the input radiation to generate the output radiation, the filter device (240) being tunable from a first radiation wavelength to a second radiation wavelength by mutually detuning the resonators in a period where the resonators are being retuned from the first wavelength ($\lambda_1$) to the second wavelength ($\lambda_2$) so that the filter device (240) is substantially in a non-responsive state during the period. The resonators incorporate freely suspended mirrors (360, 430) which are electrostatically actuated to affect tuning of the resonators (330, 340, 360; 360, 400, 430). The filter device (240) is thereby capable of tuning between different wavelengths without tuning through wavelengths therebetween. The filter device (240) can be included into an add-drop filter (10) for providing channel add and drop functions when the filter (10) is incorporated in a multichannel WDM communication system (100).

35 Claims, 9 Drawing Sheets

WAVELENGTH SELECTIVE OPTICAL FILTER

This application is a communication of 09/734,495 now U.S. Pat. No. 6,449,403, filed December 11, 2000, now allowed.

The present invention relates to a wavelength selective optical filter, in particular but not exclusively to a wavelength selective optical filter which is also operable to provide a controllable degree of attenuation.

In contemporary optical communication systems, wavelength division multiplexing (WDM) techniques are used. Such techniques enable many channels bearing communication traffic to be multiplexed onto radiation propagating along a guided optical path, for example an optical fibre. Each channel has associated therewith an allocated range of wavelengths which are used to convey the communication traffic associated with the channel. Thus, WDM techniques allow increased exploitation of optical fibre bandwidth in order to satisfy future demand for enhanced data rates in communication networks.

Use of WDM in contemporary communication systems has created a need for devices which can be connected to optical paths thereof conveying WDM communication traffic, the devices operable to extract communication traffic corresponding to a specific channel without interfering with communication traffic conveyed in other channels; radiation corresponding to these other channels is transmitted through the devices substantially unmodified. Such devices are known as add-drop filters.

There arises a further requirement in contemporary optical communication systems using WDM techniques and incorporating add-drop filters for the filters to be reconfigurable, namely for the filters to be retunable to select different channels. Moreover, it is a yet further requirement that the communication systems should be reconfigurable whilst in operation conveying communication traffic. Thus, each add-drop filter needs to be retunable from a first selected channel to a second selected channel without tuning through channels intermediate between the first and second channels and causing traffic conveyed in these intermediate channels being interrupted or disturbed during retuning. A number of conventional add-drop filters have been reported in the literature and sold commercially which are capable of being tuned from one channel to another. Such conventional add-drop filters incorporate optical filters which tune continuously; as a consequence, they cause disturbance of communication traffic on intermediate channels when being reconfigured. Such optical filters are implemented in a number of ways, for example as cascaded Mach-Zehnder filters fabricated as silicon planar waveguides and as micromechanically tuneable Fabry-Perot filters. A U.S. Pat. No. 5,739,945 describes a single cavity continuously-tuneable optical filter incorporating electrostatically actuated mirrors.

Tunable optical filters are known in the prior art.

For example, a U.S. Pat. No. 4,240,696 describes an optical filter including a plurality of adjacent layer pairs, each pair having an incident and an emerging surface. Each pair further comprises a first dielectric layer, a second dielectric layer and a control electrode disposed between and in contact with the layers. The filter additionally includes a plurality of ground electrodes disposed on the layer pairs to electrically contact each incident and emergent surface, a source of electrical potential, and a switch for connecting the source between the control electrodes and the ground electrodes. In the filter, optical radiation is reflected by the filter upon closing the switch and thereby applying the electrical potential in opposite directions across the first and second layers. Electrodes of the layer pairs are thus connected in parallel so that the pairs are not capable of being mutually independently tuned. Moreover, there is no basis in the context of the invention for it to be advantageous to make the pairs independently tunable.

Moreover, in a further example, a U.S. Pat. No. 5,170,290 describes high total transmission tunable comb filter structures. The structures comprise moderately thick layers of optical material having periodic refractive index modulation features comprising a multiplicity of coherently-coupled, weakly-resonant optical cavities. The structures are characterised by spectra of at least order 5 relative to a fundamental lowest-order cavity resonance consisting of narrow, moderate to high density reflection lines occurring in one or more sets, each set being characterised by lines equally spaced by wave number if optical dispersion is neglected. Filters provided by such structures can be electro-optically or mechanically tuned such that the peaks within a spectral band of interest shift by one harmonic order to reflect or transmit optical radiation of any specific wavelength within a band. The cavities are not capable of being mutually independently tuned in the embodiments described in the patent. Moreover, there is no basis in the context of the invention for it to be advantageous to make the cavities independently tunable.

A first approach to providing add-drop filters which do not tune continuously in contemporary systems involves demultiplexing and remultiplexing techniques. Use of such techniques enables add-drop filters to be isolated whilst they are retuned from one channel to another when the systems are being reconfigured. Application of such techniques results in increased insertion loss associated with add-drop filters included within the systems, the insertion loss increasing as the number of channels conveying communication traffic is increased.

A second approach employed in contemporary systems incorporating add-drop filters is for the add-drop filters to include a number of tuneable optical gratings which are tunable from a wavelength intermediate between two neighbouring channels to a given channel. This approach provides a characteristic that filters in the systems are not tuned through a number of channels before reaching their selected channel. However, the approach requires there to be provided a grating for each channel used in the systems, there arising thereby a problem that insertions loss associated with add-drop filters in the systems increases as the number of channels is increased.

There is a further disadvantage that, when the first and second approaches are adopted, add-drop filters are designed for accommodating a specific maximum number of channels; such a maximum number means that the add-drop filters have to be replaced if the number of channels used in the systems are increased by system upgrades to more than the maximum number.

The inventors have appreciated that there is a need for a wavelength selective optical filter capable of incorporation into add-drop filters of communication systems that can tune directly from a first channel to a second channel without tuning through channels intermediate between the first and second channels. Moreover, the inventors have appreciated that the optical filter should be tunable over a relatively large number of channels so that the filters do not need to be replaced when communication system upgrades are implemented.

According to a first aspect of the present invention, there is provided a wavelength selective optical filter for receiving input radiation and outputting corresponding filtered output radiation, characterised in that the filter includes a plurality of mutually independently tunable optical resonators for filtering the input radiation to generate the output radiation, the resonators being at least partially mutually coupled, and the resonators having associated therewith tuning ranges which at least partially mutually overlap.

The filter provides the advantage that it is capable of being tuned from one wavelength to another without tuning through intermediate wavelengths therebetween.

The filter of the invention is distinguished from prior art filters incorporating micro-tuned resonators in that the filter incorporates cavities which are mutually coupled. Such mutual coupling provides a more selective response than merely cascading filters as currently done in the art.

Conveniently, the filter in use is:
(a) at least partially transmissive to the input radiation to generate the output radiation when the optical resonators are mutually tuned to a similar wavelength; and
(b) substantially non-transmissive to the input radiation when the resonators are mutually detuned.

Such a filter provides the desirable characteristic that it is substantially non-transmissive to radiation whilst being retuned from wavelength to another.

Preferably, the coupling from one of the resonators to another resonator adjacent thereto is in a range of 0.01 to 0.1% to obtain a useable degree of selectivity from the filter.

Advantageously, the resonators include first and second tunable Fabry-Perot cavities, the cavities being at least partially mutually coupled through a component common to the cavities. The cavities provide a resonance characteristic when there are an integer number of half wavelengths of radiation propagating between mirrors of the cavities.

Conveniently, the component is a second mirror assembly spatially located between the cavities, the first and second cavities having associated therewith first and third mirror assemblies respectively, the first and second assemblies defining the first cavity, and the second and third assemblies defining the second cavity. The second mirror assembly provides a degree of mutual coupling between the cavities to provide the filter with its wavelength selective response.

When implementing the filter, each cavity preferably includes a void in a region between its associated mirror assemblies. Advantageously, the void is in a range of 10 to 20 $\mu$m wide in a direction normal to major planes of its associated mirror assemblies, although 14 $\mu$m is its preferred width.

In order to improve response of the filters, the reflectors are preferably distributed Bragg reflectors. Such reflectors can be provided by each assembly comprising multi-layer structures.

AlGaAs, GaAs and AlAs will be used hereafter as abbreviations for aluminium gallium arsenide, gallium arsenide and aluminium arsenide respectively.

Advantageously, each multilayer structure comprises a plurality of alternating layers of AlGaAs and aluminium oxide. Conveniently, the aluminium oxide layers each have a thickness in a range of 300 nm to 350 nm, although 314.5 nm is a preferred thickness.

Moreover, the AlGaAs layers of the first and third assemblies are such that each layer beneficially comprises first, second and third sub-layers so that:
(i) the first and third sub-layers have a composition $Al_aGa_bAs$ where a is in a range of 0.58 to 0.62, and b is in a range 0.38 to 0.42; and
(ii) the second sub-layer has a composition $Al_cGa_dAs$ where c is in a range of 0.28 to 0.32, and d is in a range of 0.68 to 0.72.

Incorporation of the sub-layers enables optical characteristics of the assemblies to be closely controlled in manufacture.

Furthermore, in the third assembly, the first and third sub-layers are preferably each in a range of 10 to 20 nm thick, and the second sub-layer is in a range of 90 to 100 nm thick. Additionally, in the first assembly, the first and third sub-layers are preferably each in a range of 45 to 55 nm thick, and the second sub-layer is preferably in a range of 15 to 25 nm thick. However, 52.8 nm and 19.9 nm are preferred specific thicknesses for these layers.

Advantageously, the second assembly comprises aluminium oxide and AlGaAs layers such that each AlGaAs layer has a composition $Al_aGa_bAs$ where a is in a range of 0.58 to 0.62, and b is in a range 0.38 to 0.42. Preferably, in the second assembly, the AlGaAs layers are in a range of 115 to 140 nm thick. Such layer thicknesses and composition assist to provide a satisfactory assembly reflection characteristic for the filter.

Beneficially, each cavity is tunable by altering a spatial separation between its respective mirror assembly and the second mirror assembly. In order to achieve such tuning, at least part of the mirror assemblies can be resiliently suspended and their mutual spatial separation can be alterable by applying piezo-electric forces to the mirror assemblies. Alternatively, at least part of the mirror assemblies can be resiliently suspended and their mutual spatial separation can be alterable by applying electrostatic forces to the mirror assemblies; the mirror assemblies can be electrically connected to enable potential differences to be applied therebetween to generate the electrostatic forces.

In a practical implementation of the filter, the second and third mirror assemblies each advantageously comprise a central mirror region suspended on a plurality of compliant arms. In one embodiment of the invention, the central mirror region is substantially circular and suspended on four arms. Conveniently, the central region has an effective diameter in a range of 50 to 150 $\mu$m and each arm has a length in a range of 600 to 2000 $\mu$m, although an effective diameter of 100 $\mu$m and a length of 1000 $\mu$m are specific preferred dimensions.

For ease of making electrical connections to the filter, the cavities and their associated mirrors can be fabricated onto a substrate in terraced formation to enable electrical connection to be made to the mirror assemblies, the assemblies being mutually electrically isolated.

Advantageously, the filter is fabricated using gallium arsenide or silicon fabrication techniques.

According to a second aspect of the invention, there is provided an add-drop filter for receiving input communication radiation and operable to drop and add radiation corresponding to a specific channel in the input communication radiation, the add-drop filter incorporating a filter according to the first aspect of the invention for isolating radiation corresponding to the channel.

According to a third aspect of the present invention, there is provided a method of fabricating a filter according to the first aspect of the invention, the method comprising the steps of:
(a) forming a series of layers on a substrate, the layers forming mirror assemblies and spacer layers therebetween;
(b) defining features in the layers corresponding to suspended reflectors and associated compliant support arms;
(c) processing the substrate and its associated layers by etching processes to generate the mirror assemblies and optical cavities therebetween where the spacer layers are present;

(d) defining and generating features on the assemblies operable to actuate the mirror assemblies relative to one another; and (e) mounting the filter produced by steps (a) to (d) above in a carrier and making electrical connection to the filter.

Advantageously, the layers are formed by metal oxide chemical vapour deposition (MOCVD). Moreover, the spacer layers are preferentially wet etched to form the optical cavities and render the mirror assemblies freely suspended.

Conveniently, in the method, the mirror assemblies each comprise alternate layers of AlGaAs and AlAs, the AlAs subsequently heat processed to form aluminium oxide. Such alternate layers provide optimised optical properties for the mirror assemblies.

According to a fourth third aspect of the present invention, there is provided a method of tuning a filter according to the first aspect of the invention from a first wavelength to a second wavelength, the method comprising the steps of:

(a) tuning the resonators to the first wavelength so that the filter provides selective filtration at the first wavelength;

(b) detuning the resonators from the first wavelength by tuning at least one resonator in a first wavelength direction and another resonator in another wavelength direction opposite to the first wavelength direction;

(c) tuning the resonators in a mutually detuned state towards the second wavelength; and (d) tuning the resonators finally to the second wavelength so that the filter provides selective filtration at the second wavelength.

Embodiments of the invention will now be described, by way of example only, with reference to the following drawings in which.

Figure 1:
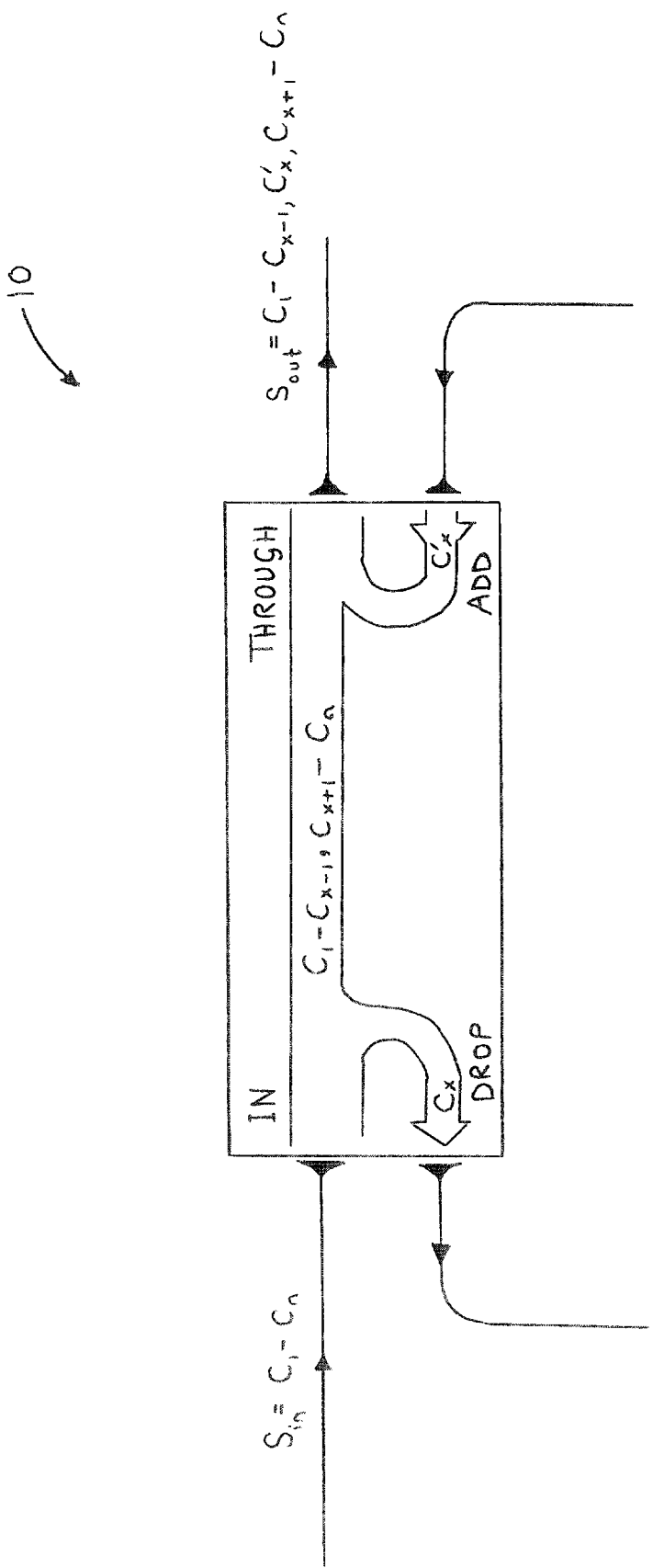
FIG. 1 is a schematic diagram of a prior art add-drop filter illustrating its channel isolation function.

Referring to FIG. 1, there is shown a prior art add-drop filter indicated by 10. The filter comprises an input port (IN), a through port (THROUGH), a drop port (DROP) and an add port (ADD); all the ports are adapted to interface to optical fibre waveguides. The input port is operable to receive input radiation $S_{in}$ and the through port is operable to provide output radiation $S_{out}$.

The filter 10 is designed to operate over a range of wavelengths which accommodates the radiation $S_{in}$. The radiation $S_{in}$ is a summation of radiation components associated with a sequence of channels $C_i$ where an index i is an integer in a range of 1 to n which individually identifies each channel, there being n channels in total in the radiation $S_{in}$; for example, the radiation $S_{in}$ has a wavelength in the order of 1550 nm with the channels spaced at wavelength intervals of 0.8 nm. The channels $C_i$ monotonically change in wavelength according to their respective channel number index i.

Operation of the filter 10 will now be described with reference to FIG. 1. The input radiation $S_{in}$ propagates to the input port (IN) and further therefrom into the filter 10 whereat a radiation component corresponding to a channel $C_x$ is extracted from the radiation $S_{in}$ and output to the drop port (DROP). The radiation $S_{in}$ minus components corresponding to the channel $C_x$, namely modified radiation $S'_{in}$, propagates further into the filter 10 whereat a radiation component corresponding to a channel $C'_x$ input to the add port (ADD) is added to the radiation $S'_{in}$ to yield the radiation $S_{out}$ which is then output at the through port (THROUGH). Thus, the output radiation $S_{out}$ corresponds to the input radiation $S_{in}$ except that the component of radiation corresponding to the channel $C_x$ in the input radiation is replaced by a component of radiation corresponding to the channel $C'_x$ in the output radiation.

Figure 2:
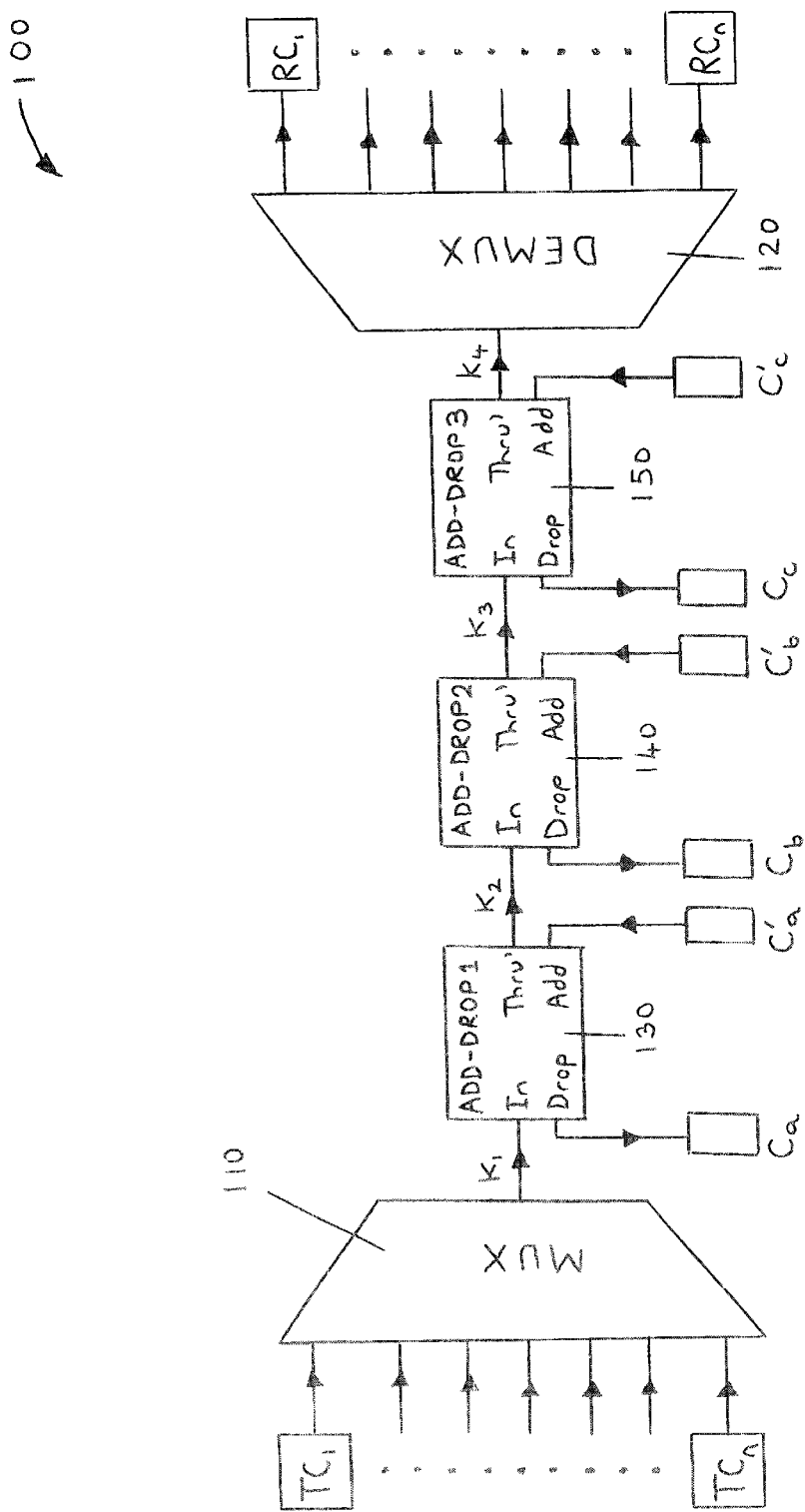
FIG. 2 is a schematic diagram of a prior art communication system incorporating three add-drop filters similar to the filter in FIG. 1.

A conventional communication system incorporates a number of filters similar to the add-drop filter 10; such a conventional system is indicated by 100 in FIG. 2. The system 100 includes a multiplexer unit 110, a demultiplexer unit 120 and three add-drop filters 130, 140, 150 connected in series and inserted in a communication path connecting the multiplexer unit 110 to the demultiplexer unit 120. Each add-drop filter 130, 140, 150 is of an identical design to the filter 10. Moreover, the filters 130, 140, 150 are operable to filter channels $C_a$, $C_b$, $C_c$ respectively where integer subscripts a, b, c can be mutually different and are included in a range of 1 to n.

The transmitter unit 110 comprises a series of optical inputs $TC_1$ to $TC_n$ for receiving optical radiation corresponding to the channels $C_1$ to $C_n$ respectively. In a similar manner, the receiver unit 120 comprises a series of optical outputs $RC_1$ to $RC_n$ corresponding to the channels $C_1$ to $C_n$.

Operation of the system 100 will now be described. The multiplexer unit 110 multiplexes the inputs TC to corresponding wavebands in output optical radiation $K_1$. The radiation $K_1$ propagates from the unit 110 to the filter 130 which filters out a component of the radiation $K_1$ corresponding to the channel $C_a$ and outputs the component at its drop port. The filter 130 also adds radiation input to its add port to a portion of the radiation $K_1$ propagating through the filter 130 to generate output radiation $K_2$. The radiation $K_2$ propagates to the filter 140 whereat a component of radiation corresponding to the channel $C_b$ is isolated and output it at its drop port. In a similar manner to the filter 130, the filter 140 also adds radiation input to its add port to a portion of the radiation $K_2$ propagating through the filter 140 to generate output radiation $K_3$. The radiation $K_3$ propagates to the filter 150 whereat a component of radiation corresponding to the channel $C_c$ is isolated and output it at its drop port. The filter 150 also adds radiation input to its add port to a portion of the radiation $K_3$ propagating through the filter 150 to generate output radiation $K_4$. The output radiation $K_4$ propagates to the demultiplexer unit 120 whereat it is demultiplexed to generate output optical radiation at the outputs RC. The radiation at the outputs RC correspond to those at the inputs TC except for the radiation input at inputs $TC_a$, $TC_b$, $TC_c$ on account of the action of the filters 130, 140, 150. Additional components (not shown) are connected to the filters 130, 140, 150 for processing radiation isolated at the filters and for generating radiation to be input to the add ports of the filters 130, 140, 150.

The inventors have appreciated that it is highly desirable for the system 100 to be reconfigurable so that the subscripts a, b, c can be altered without interrupting traffic flow from the multiplexer unit 110 to the demultiplexer unit 120. Such reconfiguration of the system 100 can be achieved by the add-drop filters 130, 140, 150 incorporating therein wavelength selective optical filters, each filter tunable from a first channel to a second channel without tuning through channels intermediate between the first and second channels and operable to provide add-drop functions for their associated add-drop filter.

Figure 3:
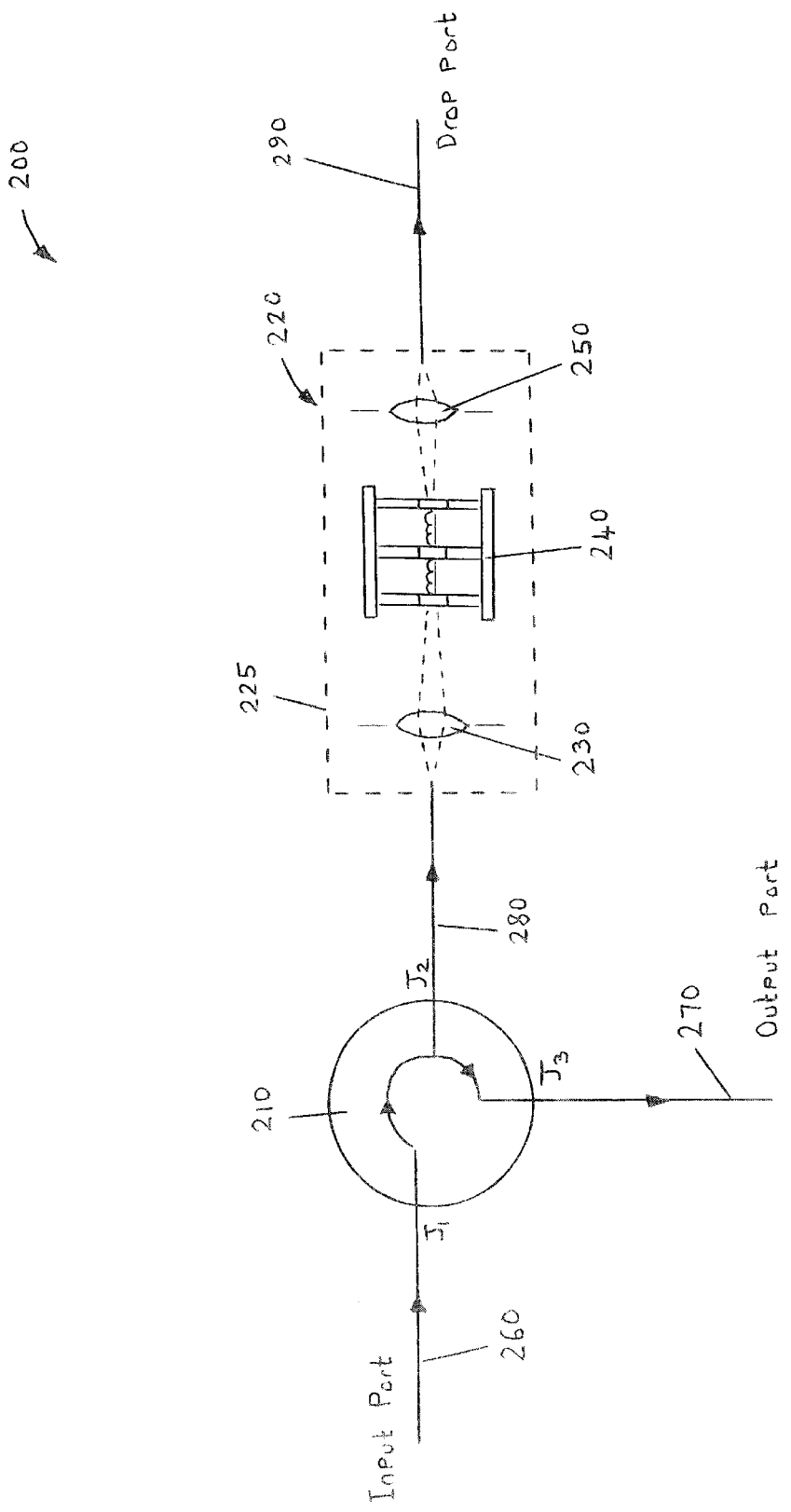
FIG. 3 is an illustration of a wavelength selective optical filter according to the invention comprising a filter module connected to a circulator to provide an optical drop function for the add-drop filter in FIG. 1.

Referring now to FIG. 3, there is indicated by 200 a wavelength selective optical filter according to the invention operable to provide an optical drop function for its associated add-drop filter 10. The filter 200 comprises a circulator 210 and a filter module 220, the module 220 shown included within a dotted line 225. The filter module 220 comprises an input lens 230, a tuneable filter device 240 and an output lens 250. The filter 200 incorporates an input port connected through an optical fibre 260 to an input port $J_1$ of the circulator 210. Moreover, the circulator 210 comprises an output port $J_3$ which is connected through an optical fibre 270 to an output port of the filter 200. Furthermore, the circulator 200 comprises a further port $J_2$ which is connected through an optical fibre 280 to the input lens 230. The output lens 250 is connected through an optical fibre 290 to a drop port of the filter 200.

Operation of the filter 200 will now be described with reference to FIG. 3. The input port of the filter 200 receives the radiation $S_{in}$ applied to the IN port of the filter 10. The radiation $S_{in}$ propagates along the fibre 260 to the input port $J_1$ of the circulator 210. The radiation $S_{in}$ propagates within the circulator 210 to the port $J_2$ at which it is output to propagate along the fibre 280 and through the lens 230 to the filter device 240; the lens 230 forms a beam having a diameter in a range of 50 to 100 $\mu$m which is received by the device 240. If the beam received by the device 240 is broader than 100 $\mu$m, deterioration in the filter 200 response will result. The device 240 is tuned to a channel $C_x$ where an integer index x is in a range of 1 to n. Radiation components in the radiation $S_{in}$ corresponding to the channel $C_x$ propagate through the device 240 and are received at the lens 250 through which they propagate onwards and through the fibre 290 to the drop port of the filter 200. Radiation components in the radiation $S_{in}$ corresponding to the channels $C_1$ to $C_{x-1}$ and $C_{x+1}$ to $C_n$ are reflected from the device 240 and propagate back through the lens 230 and the fibre 280 to the port $J_2$ of the circulator 210; these components propagate further in the circulator 210 to its output port $J_3$ and further therefrom along the fibre 270 to the output port of the filter 200.

The filter 10 includes first and second filter units, the first unit corresponding to the filter 200 and the second unit corresponding to a modified version of the filter 200 adapted for injecting radiation components corresponding to the channel $C_x$.

The filter device 240 will now be described in further detail with reference to FIG. 4. The device 240 comprises a thinned gallium arsenide substrate 300 having a thickness in a range of 150 $\mu$m to 250 $\mu$m, although 200 $\mu$m is a preferred thickness. The substrate 300 comprises a first major face indicated by 310 which is coated in an anti-reflection coating 305 operable to counteract reflection from the face 310 at infra-red radiation wavelengths in the order of 1500 nm. The substrate 300 comprises a second major face indicated by 320 on an opposite side of the substrate 300 to the first face 310. The second face 320 has fabricated thereon a first mirror assembly 330 comprising alternate layers of AlGaAs and aluminium oxide, namely four layers of AlGaAs and three layers of aluminium oxide. Each of the aluminium oxide layers is in a range of 300 to 350 nm thick, although 314.5 nm is its preferred thickness. Each AlGaAs layer comprises three sequential sub-layers, namely first, second and third sub-layers such that:

(i) the first and third sub-layers have a composition $Al_aGa_bAs$ where a is in a range of 0.58 to 0.62, and b is in a range 0.38 to 0.42; and (ii) the second sub-layer has a composition $Al_cGa_dAs$ where c is in a range of 0.28 to 0.32 and d is in a range of 0.68 to 0.72.

A preferred composition for the first and third sub-layers is $Al_{0.6}Ga_{0.4}As$, and a preferred composition for the second sub-layer is $Al_{0.3}Ga_{0.7}As$. The first and third sub-layers are each in a range of 45 to 55 nm thick, and the second sub-layer is in a range of 15 to 25 nm thick. However, 52.8 nm is a preferred thickness for each of the first and third sub-layers, and 19.9 nm is a preferred thickness for the second sub-layer.

Above the mirror assembly 330 remote from the substrate 300 is a first cavity 340 of height in a range of 10 to 20 $\mu$m in a direction normal to the major faces 310, 320 of the first assembly 330, although 14 $\mu$m is a preferred height. Suspended above the first assembly 330, and separated therefrom by the first cavity 340, is a second mirror assembly indicated by 350.

The second assembly 350 is unitary and incorporates a central substantially circular mirror 360 suspended on four arms, for example an arm 370, from a peripheral region 380 of the assembly 350, the peripheral region 380 connected to the first assembly 330 by way of a first relatively thick layer of GaAs, the first relatively thick layer being substantially 14 $\mu$m thick.

The central mirror 360 and its associated arms are fabricated by forming four holes, for example a hole 390, into the mirror assembly 350. Thus, the central mirror 360, its associated arms and the peripheral region 380 are all of unitary construction. The central mirror 360 has an effective diameter in a range of 50 to 150 $\mu$m, although 100 $\mu$m is its preferred diameter. Each arm has a length in a range of 600 to 2000 m although 1000 $\mu$m is its preferred length. The arms each have a lateral width in a range of 15 to 30 $\mu$m, although 20 $\mu$m is their preferred width.

The second assembly 350, in a similar manner to the first assembly 330, is a multilayer structure comprising alternate layers of AlGaAs and aluminium oxide. Each of the aluminium oxide layers is in a range of 300 to 350 nm thick, although 314.5 nm is its preferred thickness. Likewise, each of the AlGaAs layers is in a range of 115 to 140 nm thick, although 125.0 nm is a preferred thickness. The AlGaAs layers have a composition $Al_aGa_bAs$ where a is in a range of 0.58 to 0.62, and b is in a range 0.38 to 0.42; however, $Al_{0.6}Ga_{0.4}As$ is a preferred composition for the layers.

In the second assembly, there are six aluminium oxide layers and seven AlGaAs layers.

Above the mirror assembly 350 remote from the substrate 300 is a second cavity 400 of height in a range of 10 to 20 $\mu$m in a direction normal to the major faces 310, 320 of the first assembly 330, although 14 $\mu$m is a preferred height. Suspended above the second assembly 350, and separated therefrom by the second cavity 400, is a third mirror assembly indicated by 420.

The third assembly 420 includes a substantially circular central mirror 430 suspended on four arms, for example an arm 440, from a peripheral region 450. The mirror 430, the arms and peripheral region 450 are unitary parts of the assembly 420. Moreover, the mirror 430 and the arms of the assembly 420 are of similar lateral dimensions to the mirror 360 and the arms of the first assembly 330. Furthermore, the mirrors 360, 430 are mutually aligned along an axis normal to the plane of the first and second assemblies 330, 350. The peripheral region 450 is connected to the peripheral region 380 of the second assembly 350 by way of a second relatively thick layer of GaAs between the peripheral regions 380, 450, the layer having a thickness in a range of 10 to 20 µm although substantially 14 µm is a preferred thickness.

The third assembly 420, in a similar manner to the first and second assemblies 330, 350, is a multilayer structure comprising alternate layers of AlGaAs and aluminium oxide. Each of the aluminium oxide layers is in a range of 300 to 350 nm thick, although 314.5 nm is its preferred thickness.

Each AlGaAs layer of the third assembly 420 comprises three sequential sub-layers, namely first, second and third sub-layers such that:
 (i) the first and third sub-layers have a composition $Al_aGa_bAs$ where a is in a range of 0.58 to 0.62, and b is in a range 0.38 to 0.42; and
 (ii) the second sub-layer has a composition $Al_cGa_dAs$ where c is in a range of 0.28 to 0.32, and d is in a range of 0.68 to 0.72.

A preferred composition for the first and third sub-layers is $Al_{0.6}Ga_{0.4}As$, and a preferred composition for the second sub-layer is $Al_{0.3}Ga_{0.7}As$.

The first and third sub-layers are each in a range of 10 to 20 nm thick, and the second sub-layer is in a range of 90 to 100 nm thick. However, 13.5 nm is a preferred thickness for each of the first and third sub-layers, and 94.9 nm is a preferred thickness for the second sub-layer.

The first and second cavities 340, 400 enable the mirrors 360, 430 to be freely suspended on their respective arms, a mutual spacing between the mirrors 360, 430 and the first assembly 330 being adjustable by applying forces to the mirrors 360, 430. Such forces can be electrostatically or piezo-electrically generated. Adjustment of such forces enables the device 240 to be tuned.

Moreover, the relatively complex arrangement of layers in the assemblies 330, 350, 420 is chosen to allow precise adjustment of layer refractive index and hence overall central mirror 360, 430 and first assembly 330 reflectivity.

Figure 4:
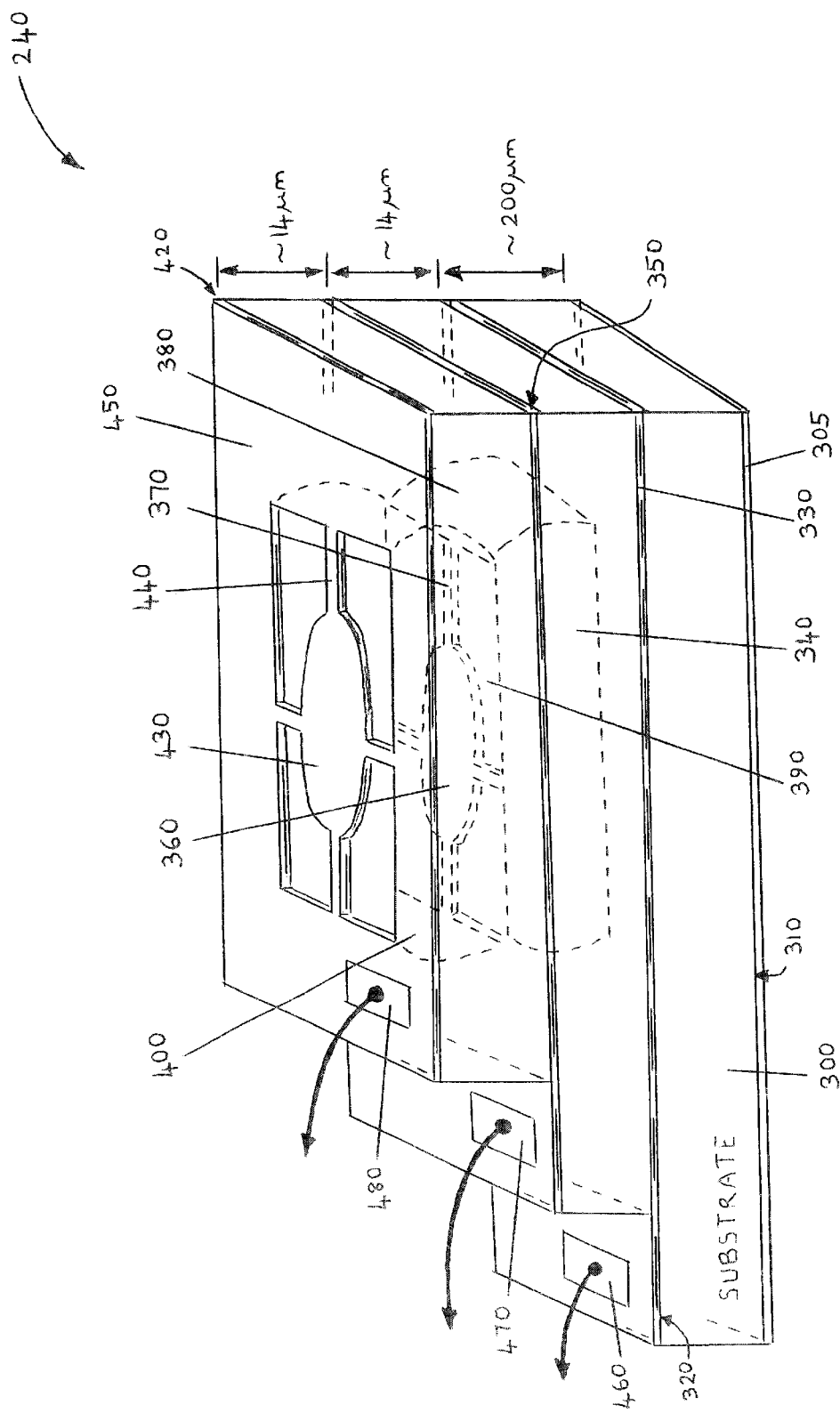
FIG. 4 is a schematic of a filter device included in the filter module illustrated in FIG. 3.

The peripheral regions 380, 450 are arranged in terraced formation as shown in FIG. 4 in order to facilitate electrical connection by wire bonding to connection pads 460, 470, 480 associated with the assemblies 330, 350, 420 respectively. The relatively thick GaAs layers are operable to substantially mutually electrically isolate the assemblies 330, 350, 420. Moreover, when electrostatic forces are to be used to actuate the central mirrors 360, 430 relative to one another and the first assembly 330, the assemblies 330, 350, 420 are sufficiently conductive so that electrical potentials applied to the pads 460, 470,480 through associated wires bonded thereto control potentials of the central mirrors 360, 430 relative to the first assembly 330.

Operation of the filter device 240 will now be described with reference to FIGS. 3 and 4. Incoming radiation propagating along the fibre 280 from the circulator 210 is focussed by the lens 230 onto the central mirror 430 of the third assembly 420. The central mirror 430 is partially transmissive and radiation incident thereupon propagates into the second cavity 400 and is largely reflected at the central mirror 360 back to the central mirror 430. If the radiation has components of a wavelength such that the effective distance between the central mirrors 360, 430 is an exact number of half wavelengths, resonance within the second cavity 400 occurs and the components give rise to standing waves in the second cavity. Alternatively, if the radiation has components of a wavelength such that the effective distance between the central mirrors 360, 430 is not an exact number of half wavelengths, no standing waves are formed. The second cavity 400 is weakly coupled through the central mirror 360 to the first cavity 340 and vice versa such that coupling from one cavity to another is in a range of 0.01 to 0.1%. When the first cavity 340 is also tuned to the same wavelength as the second cavity 400, resonance in the first cavity 340 results in an efficient coupling of radiation components corresponding to resonance from the second cavity 400 into the first cavity 340. The first assembly 330 is partially transmissive to radiation so that components of radiation at resonance in the first cavity 340 are transmitted through the first assembly 330 and through the substrate 300 and its antireflection coating 305 to propagate to the lens 250 and further along the fibre 290 to the drop port.

Components of radiation corresponding to resonance of the cavities 340, 400 are thereby transmitted through the device 240 whereas components of radiation not corresponding to resonance are reflected from the second and third assemblies 350, 420 back to the circulator 210. Transmission through the device 240 substantially only occurs when the cavities 340, 400 are tuned to a mutually similar wavelength so that their resonances correspond.

Figure 5:
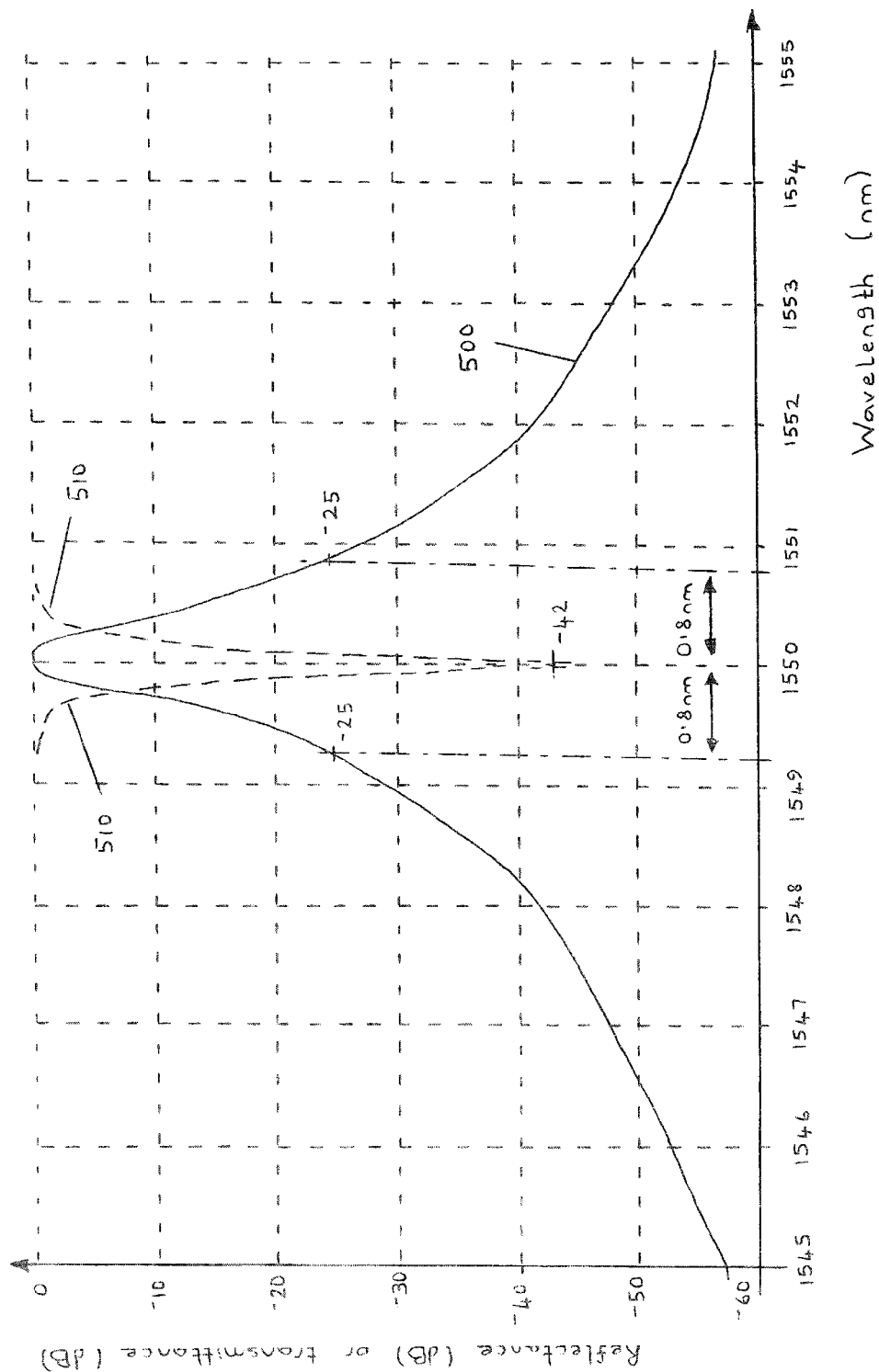
FIG. 5 is a graph of transmission and reflection characteristics of the filter device in FIG. 4.

Referring now to FIG. 5, there is shown a graph of transmission and reflection characteristics of the filter device 240 in FIG. 4 when the cavities 340, 400 are tuned to a similar resonance wavelength, namely 1550 nm. In the graph, a curve 500 depicts radiation transmission through the device 240 and a dashed curve 510 depicts radiation reflection from the device 240. Radiation attenuation through the device 240 at resonance are less than 1 dB although coupling losses associated with the lenses 230, 250 and the fibres 280, 290 result in a overall insertion loss between the circulator 210 and the drop port in a range of 1 to 2 dB. The graph shows that reflection loss from the device 240 at resonance is at a level of −42 dB when its transmissive attenuation loss is less than 1 dB. Moreover, reflection loss exhibited by the device 240 is less than 1 dB when its transmission loss is at a level of −25 dB at a wavelength difference of 0.8 nm from resonance at a wavelength of 1550 nm. At wavelength differences of more than 0.8 nm from resonance in a wavelength range of 1545 nm to 1555 nm shown in FIG. 5, transmission losses through the device 240 are in excess of 25 dB.

Figure 6:
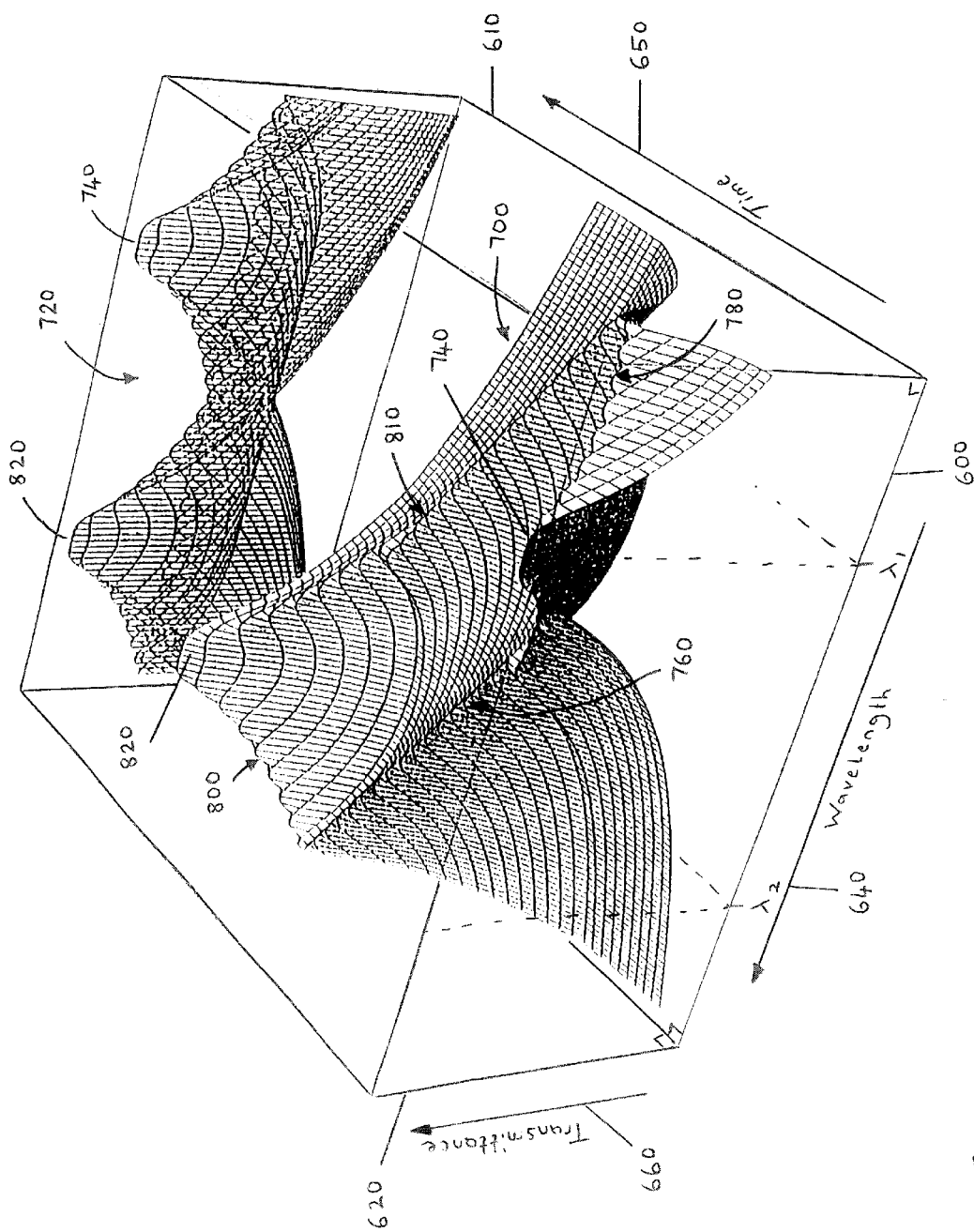
FIG. 6 is a graph of transmission characteristics of the filter device in FIG. 4 when tuning from one wavelength to another.

Operation of the device 240 switching from one channel $C_i$ to another channel will now be described with reference to FIG. 6. In FIG. 6, there is shown three mutually orthogonal axes, namely a wavelength axis 600, a time axis 610 and a transmittance axis 620. Directions of increasing wavelength, time and transmittance are indicated by arrows 640, 650, 660 respectively. Within the axes 600, 610, 620 is included a 3-dimensional curve indicated by 700 of transmittance of the device 240 depending upon time and wavelength. The curve 700 is projected as a 2-dimensional curve indicated by 720 at a rear face of the graph; this curve 720 illustrates wavelength versus transmittance.

A first peak 740 corresponds to the device 240 tuned to one of the channels $C_i$ with nominal wavelength $\lambda_1$ and a second peak 820 corresponds to the device 240 tuned to another of the channels with nominal wavelength $\lambda_2$.

Initially, the cavities 340, 400 of the device 240 are tuned to the wavelength $\lambda_1$. In order to retune the cavities 340, 400, a voltage difference applied between the second and third assemblies 350, 420 relative to a potential of the first assembly 330 is adjusted to detune both cavities 340, 400 in mutually opposite wavelength directions from the wavelength $\lambda_1$. This mutual detuning causes the first peak 740 to broaden and reduce in transmissivity as depicted by curves indicated by 760, 780, thereby effectively switching off a transmission function provided by the device 240. The two cavities 340, 400 are then tuned, by moving their respective central mirrors 360, 430 by substantially equal amounts by altering a potential difference between the assemblies 350, 420 relative to a potential the first assembly 330, towards the second wavelength $\lambda_2$ as depicted by curves indicated by 800, 810. When the cavities 340, 400 are both tuned to the wavelength $\lambda_2$, the device 240 again becomes transmissive as represented by the peak 820.

In the curve 720, it can be seen that the device 240 is substantially non-transmissive between the peaks 740, 820 thereby tuning from one channel to another without tuning through intermediate channels therebetween; in FIG. 5, the wavelengths $\lambda_1$ and $\lambda_2$ correspond to two of the channels $C_i$.

Figure 7:
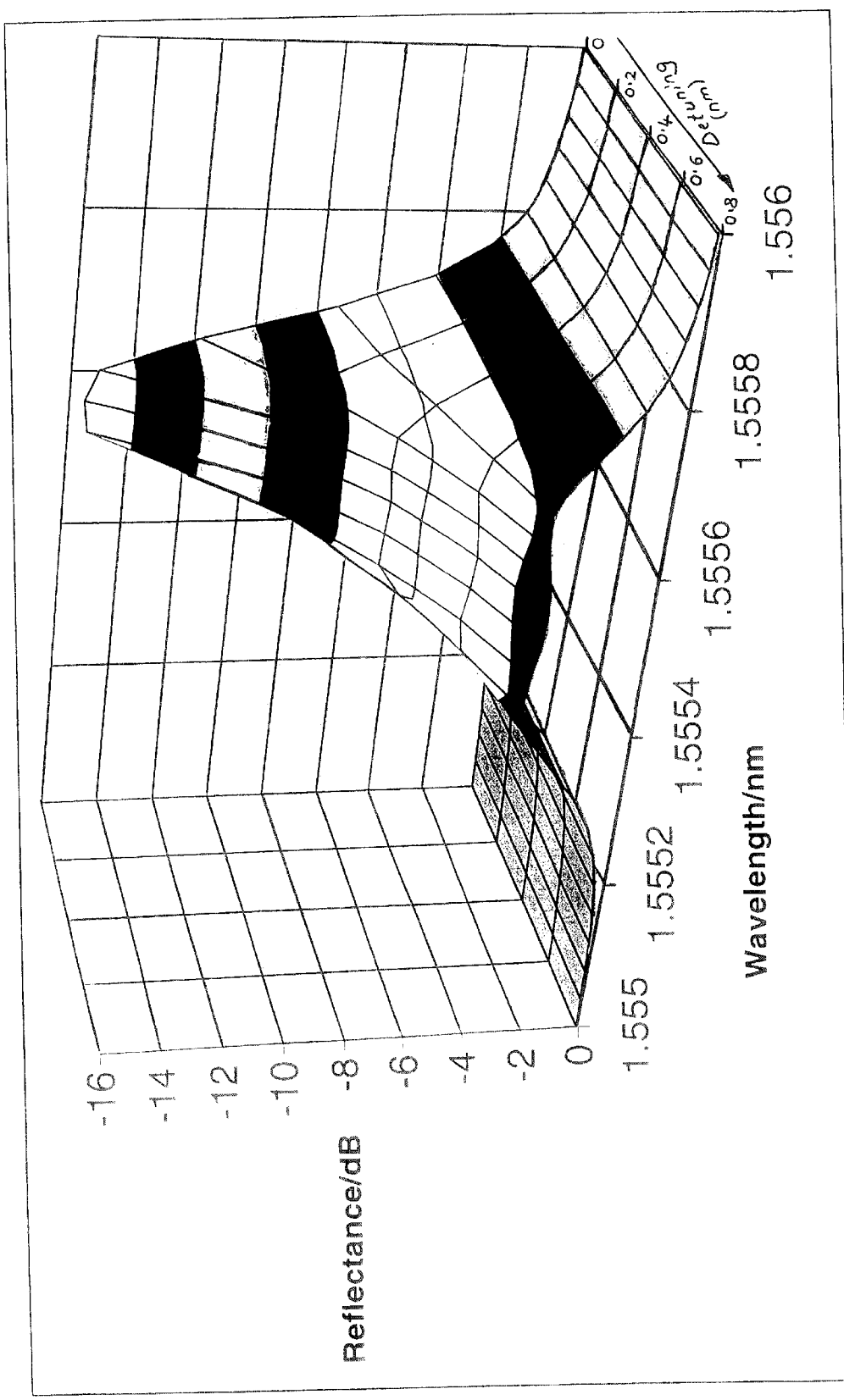
FIG. 7 is a graph of attenuation and reflectance through the filter device in FIG. 4 as it is detuned.

The device 240 is also capable of functioning as a controlled attenuator by selectively slightly mutually detuning one or more of its cavities 340, 400. Thus, the device 240 can provide wavelength selective attenuation depending upon to which channel the cavities 340, 400 are nominally tuned. A voltage difference is applied to the assemblies 350, 420 relative to the first assembly 330 can be used to determine a degree of detuning and thereby determine attenuation exhibited by the device 240. When performing an attenuating function, variation in reflectivity of the device can be utilised. FIG. 7 illustrates a graph of reflective attenuation provided by the device 240 included in the filter 200 from the fibre 280 to the fibre 290 when its cavities 340, 400 are detuned to a mutual wavelength difference of 1.6 nm, namely each cavity detuned from nominally 1550 nm by an amount of 0.8 nm. The attenuation provided by the device 240 in the filter 200 is shown to be controllable from substantially −15 dB to −3 dB.

The device 240 operating as a controlled attenuator is especially useful in communication networks where differential losses between channels accumulate through the networks and can degrade network performance. Thus, the device 240 can be used to assist with equalising power levels across the channels $C_i$ in the networks.

Figure 8:
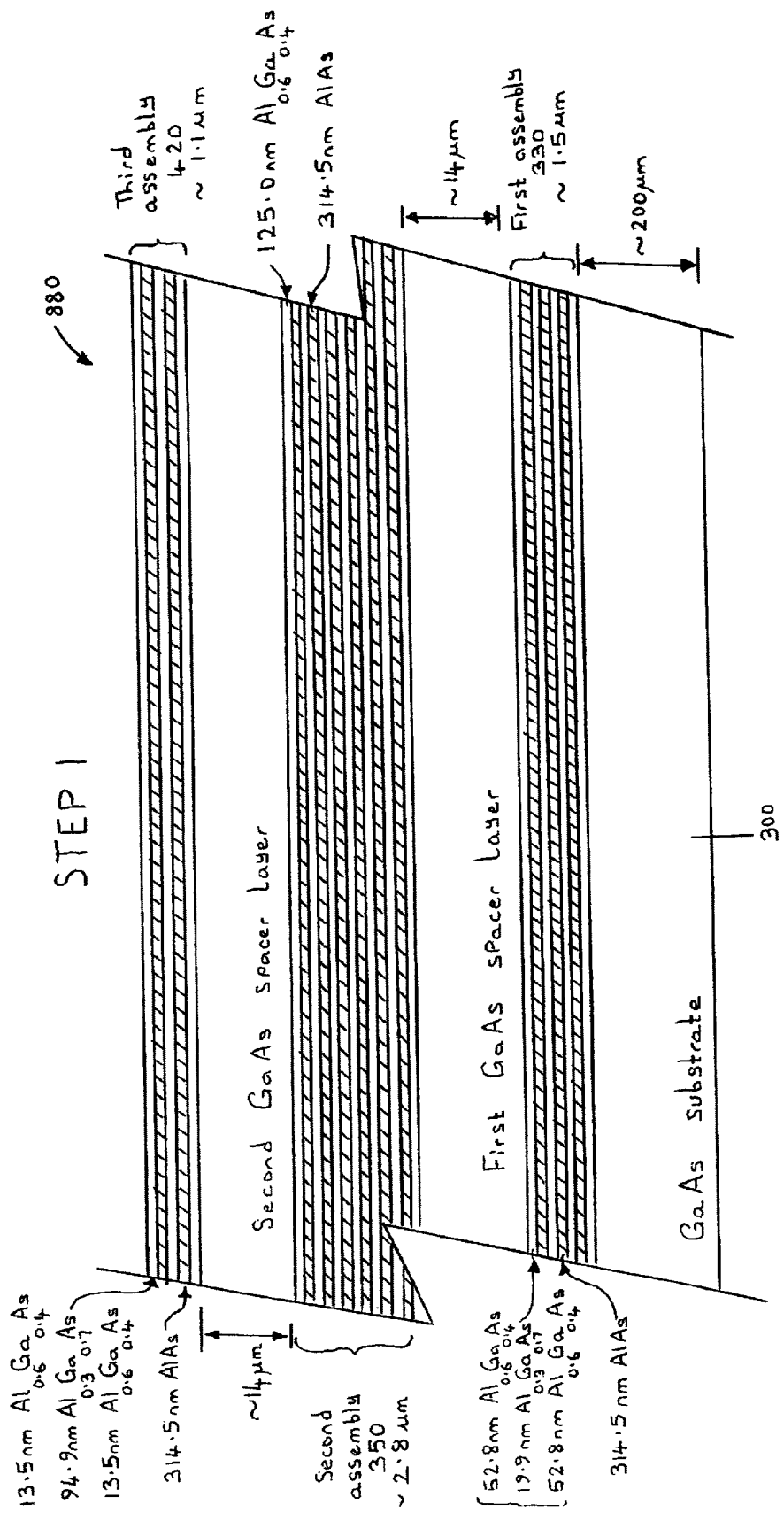
FIGS. 8 and 9 are illustrations of fabrication steps required for fabricating the filter device in FIG. 4.
Figure 9:
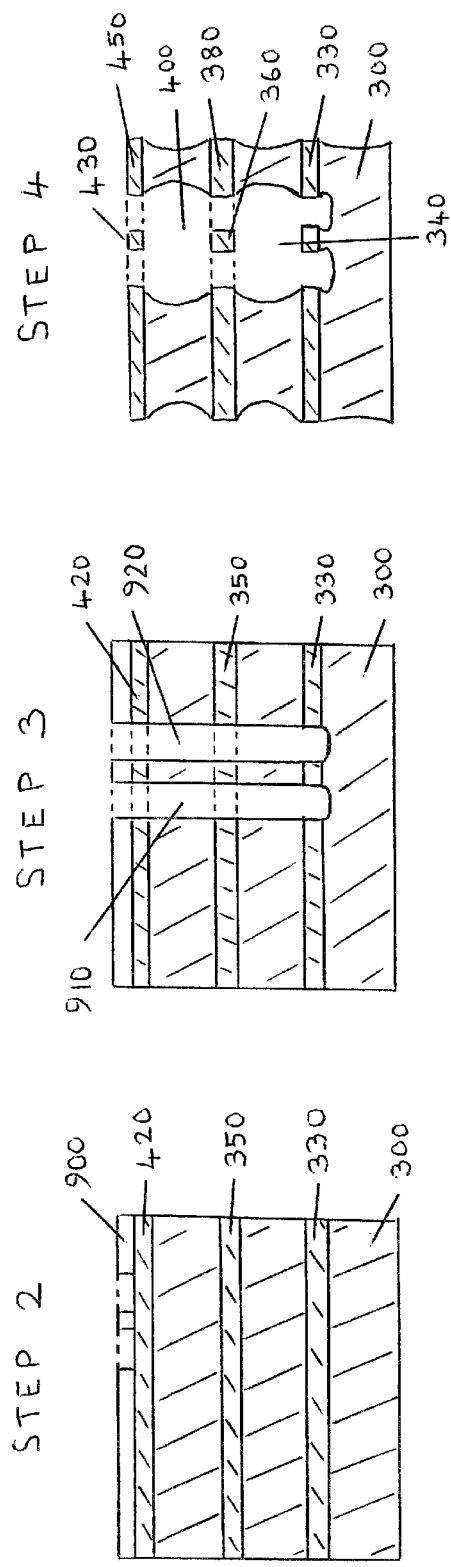
Figure 9:
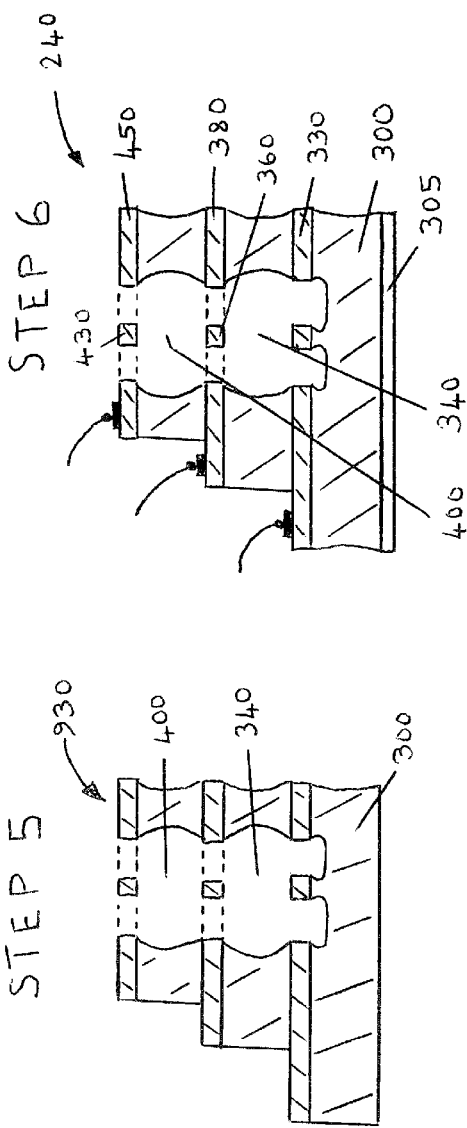

Fabrication of the device 240 will now be described. FIGS. 8 and 9 are illustrations of fabrication steps of a method of fabricating the filter device 240 in FIG. 4, the method comprising STEP 1 to STEP 6.

Step 1:

Reference is made to FIG. 8. Initially, the gallium arsenide substrate 300 is polished on both its major faces to a mirror finish and thereby thinned to a thickness of substantially 200 µm. On the major surface 320 of the substrate 300, the first assembly 330 is grown onto the substrate 300 by metal oxide chemical vapour deposition (MOCVD) in an evacuated deposition apparatus. The first assembly 330 is a distributed Bragg reflector (DBR) and comprises alternate layers of AlGaAs and AlAs. The reflector of the first assembly 330 includes four layers of AlGaAs and three layers of AlAs. The AlAs layers are each 314.5 nm thick. Moreover, the AlGaAs layers each comprise three sequential sub-layers, namely a first sub-layer of a nominal thickness 52.8 nm and a nominal composition of $Al_{0.6}Ga_{0.4}As$, a second sub-layer of a nominal thickness 19.9 nm and a nominal composition $Al_{0.3}Ga_{0.7}As$, and a third sub-layer of a thickness and a composition similar to the first sub-layer. The first assembly 330 as a result has a thickness in the order of 1.5 µm.

Next, a first spacer layer of gallium arsenide is grown onto the first assembly 330. The spacer layer is nominally of 14 µm thickness.

The second assembly 350 is then grown by MOCVD onto the first spacer layer remote from the substrate 300, the second assembly 350 also being a DBR. The reflector of the second assembly 350 includes seven layers of AlGaAs and six layers of AlAs. The AlAs layers are each 314.5 nm thick. Moreover, the AlGaAs layers are each of a nominal thickness 125.0 nm and a nominal composition of $Al_{0.6}Ga_{0.4}As$. The second assembly 350 has a thickness in the order of 2.8 µm.

Next, a second spacer layer of gallium arsenide is grown onto the first assembly 350. The spacer layer is nominally of 14 µm thickness.

Finally, the third assembly 420 is then grown by MOCVD onto the second spacer layer remote from the substrate 300, the third assembly 420 also being a DBR. The reflector of the third assembly 350 includes three layers of AlGaAs and two layers of AlAs. The AlAs layers are each 314.5 nm thick. Moreover, the AlGaAs layers each comprise three sequential sub-layers, namely a first sub-layer of a nominal thickness 13.5 nm and a nominal composition of $Al_{0.6}Ga_{0.4}As$, a second sub-layer of a nominal thickness 94.9 nm and a nominal composition $Al_{0.3}Ga_{0.7}As$, and a third sub-layer of a thickness and a composition similar to the first sublayer. The third assembly 420 has a thickness in the order of 1.1 µm.

Completion of STEP 1 results in the generation of a workpiece indicated by 880.

Step 2:

Reference is made to FIG. 9. A layer 900 of photoresist is then spun onto the third assembly 420 of the workpiece 880 and photolithographic and associated resist development techniques applied to define windows in the layer 900. The windows are useable for delineating the central mirrors 360, 430 and their associated arms in STEP 2.

Step 3:

The workpiece 880 from STEP 2 is then subjected to anisotropic reactive ion etching (RIE) or chemically assisted ion beam etching (CAIBE) where the layer 900 provides a stencil for etching. Etching is continued until holes 910, 920 through the MOCVD-deposited layers are produced which reach down through the MOCVD layers beyond the first assembly 330.

Step 4:

The workpiece 880 from STEP 3 is then subjected to a steam environment at a temperature in a range of 380 to 420° C., although 400° C. is a preferred temperature, which oxidises the AlAs layers of the workpiece 880 to aluminium oxide. The workpiece is next subjected to wet preferential etching which does not etch the assemblies 330, 350, 420 but removes part of the spacer layers in the vicinity of the holes 910, 920 to leave the central mirrors 360, 430 and their associated arms freely suspended and the cavities 340,400 defined. Moreover, the wet etching also removes residual traces of the first spacer layer remaining on the first assembly 330 in the first cavity 340 beneath the first central mirror 360.

Step 5:

Further lithographic, RIE and preferential wet etching techniques are then applied to generate a terraced profile for the workpiece 880 from step 4 as indicated by 930. This terraced profile assists with making electrical connection to the workpiece using standard wire bonding equipment. Metal is then selectively deposited onto the assemblies 330, 350, 420 to form the pads 460, 470, 480 to which connection wires are to be bonded.

Step 6:

The workpiece 880 from STEP 5 is next mounted in a suitable carrier (not shown) allowing infra-red radiation propagation through the workpiece 880, the anti-reflection coating 305 applied on the major face 310 of the substrate 300 and then wires bonded to the pads 460, 470, 480 to complete fabrication of the workpiece 880 to provide the device 240.

Several devices identical to the device 240 can be fabricated from one substrate which is cleaved after STEP 5 to provide individual devices for packaging and wire bonding.

It will be appreciated that modifications can be made to the filter 200 and the device 240 without departing from the scope of the invention. For example, the device 240 can be modified to incorporate more than two mutually coupled resonant cavities to obtain a more wavelength selective filtration response. Alternatively, several devices 240 can be cascaded in series to provide a more selective response. Furthermore, it should be noted that techniques of detuning coupled optical resonators to achieve direct channel switching in add-drop filters as used in the invention is also applicable to other types of mutually coupled optical resonator other than micro-mechanically tuned optical Fabry-Perot resonators, for example mutually coupled optical ring resonators in waveguide devices.

Although electrostatic actuation of the central mirrors 360, 430 is described above, other methods of actuation are possible; for example piezo-electric actuation where piezo-electric layers, for example comprising zinc oxide as a piezo-electric material, are fabricated onto the assemblies 330, 350, 420 in STEP 1 of the method of fabrication depicted in FIG. 8. Such piezo-electric layers enable differential stresses to be generated in arms supporting the central mirrors 360, 430 thereby causes the mirrors to change their spatial separation relative to the first assembly 330.

It will be further appreciated that feedback control can be applied to stabilise spatial separation of the mirrors 360, 430 relative to the first assembly 330 so that the device 240 remains stably tuned to its allocated channel $C_i$. Such feedback control can, for example, employ low frequency artefacts in channel radiation reflected or transmitted through the device 240, the low frequency artefacts being at channel modulation frequencies less than that of communication traffic transmitted in the channels $C_i$.

Although the aforementioned device 240 is fabricated using gallium arsenide fabrication techniques, the device 240 can also be fabricated in modified form in silicon materials, such silicon materials having superior mechanical properties compared to gallium arsenide which is relatively brittle compared to silicon. The device 240 in modified form in silicon can employ a multipart construction, the parts bonded together after fabrication, for example by fusion bonding. Alternatively, the device 240 in modified form in silicon can be fabricated as a surface structure on a silicon substrate, mirrors and arms of the device 240 in modified form being formed by epitaxial deposition processes with sacrificial oxide layers for use in generating voids corresponding to optical cavities of the device.

What is claimed is:

1. A method of fabricating a tuneable wavelength selective optical filter including a plurality of at least partially mutually coupled optical resonators in which a resonant wavelength of each resonator is independently tuneable, the method comprising the steps of:
    a) forming a series of layers on a substrate, the layers forming mirror assemblies and spacer layers therebetween;
    b) defining features in the layers corresponding to suspended reflectors and associated compliant support arms;
    c) processing the substrate and its associated layers by etching processes to generate the mirror assemblies and optical cavities therebetween where the spacer layers are present;
    d) defining and generating features on the assemblies operable to actuate the mirror assemblies relative to one another; and
    e) mounting the filter in a carrier and making electrical connection to the filter.

2. The method according to claim 1, in which the layers are formed by metal oxide chemical vapor deposition (MOCVD).

3. The method according to claim 1, in which the spacer layers are preferentially wet etched to form the optical cavities and render the mirror assemblies freely suspended.

4. The method according to claim 1, in which the mirror assemblies each comprise alternate layers of aluminum gallium arsenide and aluminum arsenide; and further comprising the step of heat processing the aluminum arsenide to form aluminum oxide.

5. A method of tuning a tuneable wavelength selective optical filter from a first wavelength range to a second wavelength range, the filter including a plurality of at least partially mutually coupled optical resonators in which a resonant wavelength of each resonator is independently tuneable, the method comprising the steps of:
    a) tuning the resonant wavelength of each of the resonators to the first wavelength range so that the filter provides selective filtration at the first wavelength range;
    b) altering the resonant wavelength of at least one resonator to mutually detune the resonators;
    c) altering the resonant wavelength of each of the resonators in the mutually detuned state towards the second wavelength; and
    d) tuning the resonant wavelength of each resonator finally to the second wavelength range so that the filter provides selective filtration at the second wavelength range.

6. The method according to claim 5 in which the resonators are mutually detuned from the first wavelength range by tuning at least one resonator in a first wavelength direction and another in a direction opposite to the first wavelength direction.

7. The method according to claim 6, and further comprising the step of tuning the resonators in their mutually detuned state towards the second wavelength range.

8. A method of selecting a selected channel from wavelength division multiplex (WDM) radiation, said WDM radiation comprising a plurality of channels each channel having associated therewith an allocated wavelength range, the method comprising the steps of:
    a) providing a tuneable filter including a plurality of at least partially mutually coupled optical resonators in which a resonant wavelength of each resonator is independently tuneable;
    b) applying said WDM radiation to an input of said filter;
    c) tuning the resonant wavelength of each of the resonators to a first wavelength corresponding to a first selected channel so that the filter provides selective filtration at a first wavelength range corresponding to the first selected channel;
    d) altering the resonant wavelength of at least one resonator to mutually detune the resonators in a mutually detuned state;

e) altering the resonant wavelength of each of the resonators in the mutually detuned state towards a second wavelength corresponding to a second selected channel; and f) tuning the resonant wavelength of each resonator finally to the second wavelength so that the filter provides selective filtration at a second wavelength range corresponding to the second selected channel.

9. The method according to claim 8, and comprising tuning the resonators in their mutually detuned state through any channels lying in wavelength between the first and second selected channels.

10. The method according to claim 8, and comprising mutually detuning the resonator from the first wavelength by tuning at least one resonator in a first wavelength direction and another in a direction opposite to the first wavelength direction.

11. The method according to claim 10, and comprising tuning the resonators in their mutually detuned state towards the second wavelength.

12. A tuneable wavelength selective optical filter, comprising: a plurality of at least partially mutually coupled optical resonators, each resonator comprising a Fabry-Perot cavity defined between partially reflecting planes and having associated therewith a resonant wavelength, the cavities being mutually coupled to each other through a reflecting plane common to the cavities, wherein the filter is at least partially transmissive when the resonant wavelength of each cavity is substantially the same, the filter being transmissive at a wavelength range corresponding to the resonant wavelength and substantially non-transmissive when the resonant wavelengths of each cavity are not substantially the same, and wherein at least one reflecting plane associated with each cavity is independently moveable to enable a separation between the planes to be independently alterable, thereby enabling the resonant wavelength of each cavity to be independently tuned.

13. The tunable filter according to claim in which the common reflecting plane is independently moveable.

14. The tuneable filter according to claim 12, in which mutual coupling from one resonator to an adjacent resonator is in a range of 0.01 to 0.1%.

15. The tuneable filter according to claim 12, in which each reflecting plane comprises a respective mirror assembly, wherein a first cavity is defined between a first and a second mirror assembly and a second cavity is defined between the second mirror assembly and a third mirror assembly, the second mirror assembly being spatially located between the first and third mirror assemblies and independently moveable.

16. The tuneable filter according to claim 15, in which the assemblies each comprise multi-layer structures.

17. The tuneable filter according to claim 15, in which each multilayer structure comprises a plurality of alternating layers of aluminum gallium arsenide and aluminum oxide.

18. The tuneable filter according to claim 17, in which the aluminum oxide layers each have a thickness in a range of 300 nm to 350 nm.

19. The tuneable filter according to claim 17, in which aluminum gallium arsenide layers of the first and third assemblies are such that each layer comprises first, second and third sub-layers in which the first and third sub-layers have a composition $Al_aGa_bAs$ where a is in a range of 0.58 to 0.62, and b is in a range 0.38 to 0.42; and the second sub-layer has a composition $Al_cGa_dAs$ where c is in a range of 0.28 to 0.32, and d is in a range of 0.68 to 0.72.

20. The tuneable filter according to claim 19, in which, in the third assembly, the first and third sub-layers are each in a range of 10 to 20 nm thick, and the second sub-layer is in a range of 90 to 100 nm thick.

21. The tuneable filter according to claim if in which, in the first assembly, the first and third sub-layers are each in a range of 45 to 55 nm thick, and the second sub-layer is in a range of 15 to 25 nm thick.

22. The tuneable filter according to claim 17, in which the aluminum gallium arsenide layers of the second assembly have a composition $Al_aGa_bAs$ where a is in a range of 0.58 to 0.62, and b is in a range 0.38 to 0.42.

23. The tuneable filter according to claim 22, in which, in the second assembly, the aluminum gallium arsenide layers are in a range of 115 to 140 nm thick.

24. The tuneable filter according to claim 15, in which the second mirror assembly and at least one other mirror assembly are resiliently suspended and their mutual spatial separation is alterable by applying piezo-electric forces to the mirror assemblies.

25. The tuneable filter according to claim 24, in which the resiliently suspended mirror assemblies each comprise a central mirror region suspended on a plurality of compliant arms.

26. The tuneable filter according to claim 25, in which each central mirror region is substantially circular and suspended on four arms.

27. The tuneable filter according to claim 26, in which each central region has an effective diameter in a range of 50 to 150 μm and each arm has a length in a range of 600 to 2000 μm.

28. The tuneable filter according to claim 15, in which the second mirror assembly and at least one other mirror assembly are resiliently suspended and their mutual spatial separation is alterable by applying electrostatic forces to the mirror assemblies.

29. The tuneable filter according to claim 28, in which the mirror assemblies are electrically connected to enable potential differences to be applied thereto to generate the electrostatic forces.

30. The tuneable filter according to claim 28, in which the resiliently suspended mirror assemblies each comprise a central mirror region suspended on a plurality of compliant arms.

31. The tuneable filter according to claim 30, in which each central mirror region is substantially circular and suspended on four arms.

32. The tuneable filter according to claim 31, in which each central region has an effective diameter in a range of 50 to 150 μm and each arm has a length in a range of 600 to 2000 μm.

33. The tuneable filter according to claim 28, in which the cavities and their associated mirrors assemblies are fabricated onto a substrate in terraced formation to enable electrical connection to be made to the mirror assemblies, the assemblies being substantially mutually electrically isolated.

34. The tuneable filter according to claim 12, in which each cavity includes a void in a region between associated reflecting planes.

35. The tuneable filter according to claim 34, in which the voids are in a range of 10 to 20 μm wide in a direction normal to major planes of its associated reflecting planes/mirror assemblies.

* * * * *